United States Patent
Al-Awami et al.

(10) Patent No.: US 9,616,763 B2
(45) Date of Patent: Apr. 11, 2017

(54) AUTONOMOUS CHARGING MANAGEMENT SYSTEM FOR ELECTRIC VEHICLES

(71) Applicant: KING FAHD UNIVERSITY OF PETROLEUM AND MINERALS, Dhahran (SA)

(72) Inventors: Ali Taleb Al-Awami, Dhahran (SA); Ghous Muhammad Asim Akhtar, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 131 days.

(21) Appl. No.: 14/641,249

(22) Filed: Mar. 6, 2015

(65) Prior Publication Data

US 2016/0257216 A1 Sep. 8, 2016

(51) Int. Cl.
*H02J 7/00* (2006.01)
*B60L 11/00* (2006.01)
*B60L 11/18* (2006.01)

(52) U.S. Cl.
CPC ........ *B60L 11/1862* (2013.01); *B60L 11/1848* (2013.01); *B60L 11/1866* (2013.01)

(58) Field of Classification Search
CPC .............. B60L 11/1862; B60L 11/1848; B60L 11/1866
USPC ............................................ 320/109; 701/22
See application file for complete search history.

(56) References Cited

U.S. PATENT DOCUMENTS

| | | | | |
|---|---|---|---|---|
| 5,646,512 A | * | 7/1997 | Beckwith | G05F 1/153 323/211 |
| 5,684,861 A | * | 11/1997 | Lewis | H04M 15/30 379/114.01 |
| 6,049,190 A | * | 4/2000 | Canter | H02J 7/0024 320/101 |
| 8,928,276 B2 | * | 1/2015 | Kesler | H01M 10/46 307/104 |
| 2003/0201646 A1 | * | 10/2003 | Kaploun | F03D 9/002 290/54 |
| 2013/0020993 A1 | | 1/2013 | Taddeo et al. | |
| 2013/0054045 A1 | | 2/2013 | Ramezani et al. | |
| 2013/0179061 A1 | | 7/2013 | Gadh et al. | |
| 2013/0257146 A1 | | 10/2013 | Nojima et al. | |
| 2014/0062401 A1 | | 3/2014 | Gadh et al. | |

OTHER PUBLICATIONS

A.T. Al-Awami et al., "Electric vehicle charging modulation using voltage feedback control", IEEE Power and Energy Society General Meeting (Jul. 2013), pp. 1-5.

G.M. Asim Akhtar et al., "Autonomous electric vehicle charging management over real time digital simulator", IEEE Power and Energy Society General Meeting (Jul. 2014), pp. 1-5.

\* cited by examiner

*Primary Examiner* — M'Baye Diao
(74) *Attorney, Agent, or Firm* — Richard C. Litman

(57) ABSTRACT

The autonomous charging management system for electric vehicles utilizes a voltage feedback control structure that compares the system voltage at the point of charging against a reference, while also taking into account the EV battery state of charge (SOC). A proportional control structure reduces the EV charging as the system voltage approaches the reference. Moreover, the control structure does not require any communication between the EV and the utility.

7 Claims, 14 Drawing Sheets

AUTONOMOUS CHARGING MANAGEMENT SYSTEM FOR ELECTRIC VEHICLES

CROSS-REFERENCE TO RELATED APPLICATION

This application claims the benefit of U.S. Provisional Patent Application Ser. No. 62/011,562, filed Jun. 12, 2014.

BACKGROUND OF THE INVENTION

1. Field of the Invention

The present invention relates to grid-connected EV charging systems, and particularly to an autonomous charging management system for electric vehicles.

2. Description of the Related Art

Penetration of electric vehicles (EVs) into the power grid without any negative impacts is important for their successful adoption in large numbers. While EVs have many positive benefits, such as reduced emissions and petroleum independence, their charging can have adverse effects on both the transmission and distribution grids. These impacts include line overloads, voltage sags, increased losses, and sharp peak demands. However, it has been shown that through controlled charging, the negative impacts of EV charging can be significantly reduced.

Several methods have been proposed in order to control EV charging to prevent negative impacts on the distribution system. Seine methods have focused on centralized charge control using system load forecasts to optimize the EV charging by minimizing losses or maximizing the load factor. Other methods have focused on communication-free EV charging strategies. Notwithstanding these strategies, issues of fairness among EVs connected to different nodes in the system and SOC dependency need to be addressed.

Thus, an autonomous charging management system for electric vehicles solving the aforementioned problems is desired.

SUMMARY OF THE INVENTION

The autonomous charging management system for electric vehicles utilizes a voltage feedback control structure that compares the system voltage at the point of charging against a reference, while also taking into account the EV battery state of charge (SOC). In some embodiments, a proportional control structure reduces the EV charging as the system voltage approaches the reference. Moreover, the control structure does not require any communication between the EV and the utility.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The autonomous charging management system for electric vehicles utilizes a voltage feedback control structure that compares the system voltage at the point of charging against a reference while also taking into account the EV battery state of charge (SOC). A proportional control structure reduces the EV charging as the system voltage approaches the reference. Moreover, the control structure does not require any communication between the EV and the utility.

An EV charger converts the AC current from the grid into a constant DC current in order to charge the EV battery. From the grid, the EV is, therefore, seen as a constant current source. When connected to the grid through an SAE J1772 charging station, a pilot signal is supplied to the EV from the station that tells what the maximum AC current draw is from that connection point. The EV charges at that current unless the battery management system reduces the maximum current draw to improve battery life near the end of the charging cycle, or if the EV charger cannot handle that high current level. The charging current can be varied either by varying the pilot signal at the charging station or at the EV itself. The present voltage-based controller adjusts this EV charging current, and therefore the charging load, based on the AC voltage observed at the point of connection.

The objectives of EV battery charging control are primarily to maintain the distribution system nodal voltages within acceptable limits and to flatten the feeder load profile. These will ensure that the feeder losses are reduced and overloads are avoided. At a given distribution transformer, node k along a specific phase, the load is the composition of the other household loads and the EV load. Since the voltage profile of the distribution system is a function of its loading levels, the voltage profile can be significantly enhanced by controlling the system load. In this work, the only controllable loads considered are the EVs.

In the present control structure, the feedback signal that is used as an input for the controller is the voltage at the point of charging (POC). The controller output is the regulated charging rate, or the charger current draw ($ID_i$) Since unidirectional power flow is assumed, the charging current minimum limit is zero and its maximum limit is taken from the EV charger specifications or the maximum rating of the charging station, whichever is lower. For each EV, based on the POC voltage and, possibly, the EV battery SOC, the controller decides on the regulated charging current of that EV.

Figure 1:
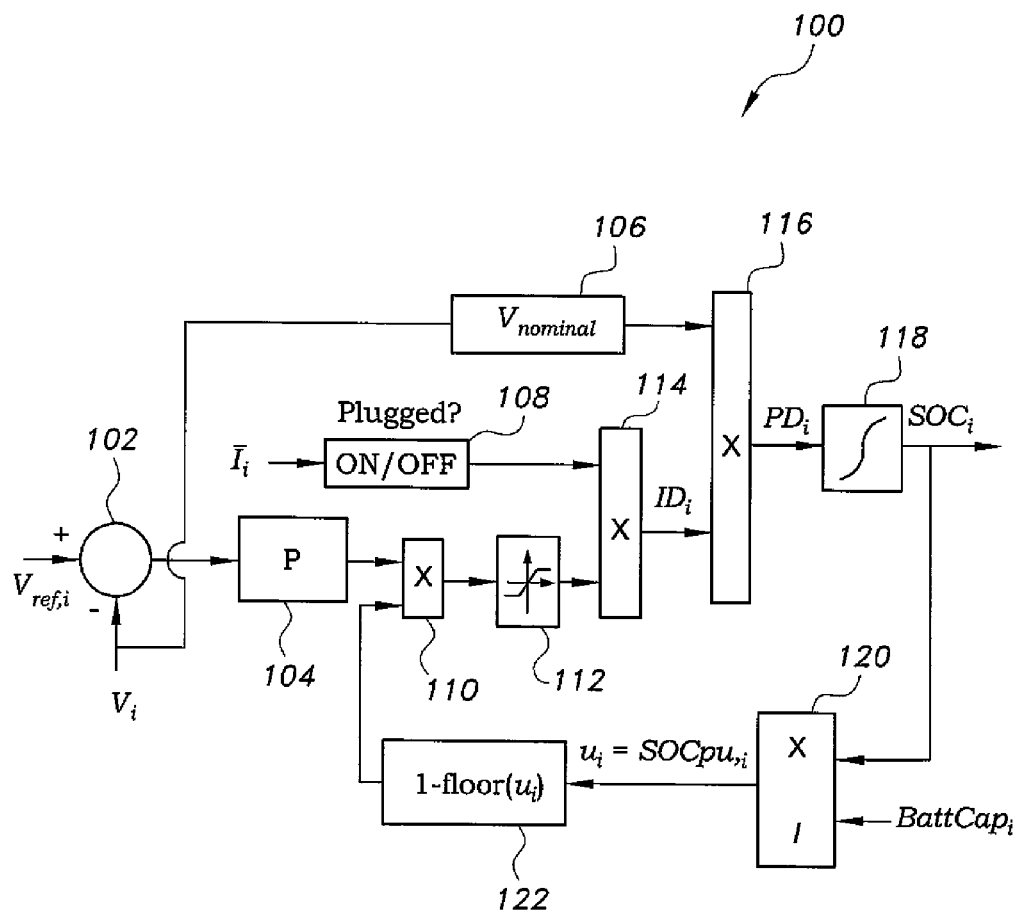
FIG. 1 is a block diagram of an analog controller for an autonomous charging management system for electric vehicles according to the present invention.

FIG. 1 shows a block diagram for the analog feedback control system 100. Reference comparator 102 adds negative $V_i$ to $V_{ref,i}$, both being in per unit (p.u.). The resultant output of reference comparator 102 is fed to proportional controller 104. Output of the proportional controller 104 is fed to a multiplier 110 that multiplies the proportional controller's output with the term $[1-\text{floor}(u_i)]$ where $u_i$ is the state of charge of the $i^{th}$ EV unit being charged. Output of multiplier 110 is fed to first limiter 112. This limits the per unit current to be between 0 and 1. Output of gain limiter 112 is fed to gating multiplier 114 which performs gating action depending on the state of on/off switch 108 (on being that the EV is plugged in to the charger, off being that the EV is not plugged in to the charger). Gating multiplier 114 output is charging current, $ID_i$ which feeds power multiplier 116. Power multiplier 116 is also fed by a nominal representation ($V_{nominal}$) of $V_i$, which is $V_i*V_{nominal}$. Output of power multiplier 116 represents the charging power $PD_i$, in Watts, which feeds state of charge (SOC) integrator 118. Output of SOC integrator 118 is $SOC_i$, the state of charge of the $i^{th}$ EV in Watt-hours. $SOC_i$ and battery capacity ($BattCap_i$) are fed to combiner 120 that provides the aforementioned $u_i$, which is the state of charge of the $i^{th}$ EV in p.u., which is fed to $1-\text{floor}(u_i)$ calculation unit 122.

Notice that there is one controller per EV. In order for the charging current, $ID_i$, to be nonzero, the EV must be plugged in, the voltage at the charging point (POC) must be within permissible limits, and the battery state of charge (SOC) must be still below the maximum battery capacity.

In its simplest form, the present controller is a proportional controller. The output of the proportional (P) controller is continuous. Hence, the regulated charging rate, $ID_i$ can take on any value between 0 and $\overline{ID_i}$ over a wide range of nodal voltage levels. As long as the $SOC_i < BattCap_i$ and $V_i > V_{ref,i}$, the regulated charging rate, $ID_i$, can be stated as:

$$ID_i = K_{p,i}*(V_i - V_{ref,i}) \tag{1}$$

where $K_{p,i}$ is the proportional control gain for the $i^{th}$ EV, $V_{ref,i}$ is the reference voltage level for the $i^{th}$ EV in per unit (pu), and $V_i$ is the actual real-time voltage in p.u. at the charging point.

Because the system loading is measured in power, not current, it is helpful to refer to the EV power draw, $PD_i$, which is merely the current draw $ID_i$, multiplied by the node voltage. Therefore, only $PD_i$ will be referenced herein even though it is $ID_i$ that is actually directly modulated. Note that the high and low limits of $PD_i$ (1 and 0, respectively) are imposed by limiter block 116, shown in FIG. 1.

The control strategy as given in (1) can be thought of effectively as a voltage droop characteristic for each EV. That is, if the voltage at a given node is close to its minimum tolerance, all EVs connected to that POC reduce their charging rates so as to avoid voltage violations. The contribution of each EV is dependent on its own droop characteristic, i.e. its $K_{p,i}$ gain. The EVs with the lower gains will charge at lower rates than the EVs with the higher gains. In this sense, this voltage droop characteristic is similar to the frequency droop characteristic used in automatic generation control to maintain generation-load balance at all times. Frequency control, however, is fundamentally different from voltage control; the former is a global issue for a given power system, while the latter is a local issue at the node level.

Another distinct feature of voltage control is that the local nodal voltages are not independent of each other. In the case of radial systems, the voltage at a downstream primary node is always less than or equal to the voltage at the primary nodes upstream to it, assuming the absence of voltage support devices, e.g. shunt capacitors. In addition, lowering the load at the downstream node improves the voltage not only at that node but also at all upstream nodes.

Suppose that the minimum voltage level at a given POC is 0.95 pu. It is required to construct a voltage droop curve for the $i^{th}$ EV that meets the following requirements, as long as $SOC_i < BattCap_i$, then:

$$\begin{cases} \text{if } V_i < V_{ref,i}, PD_i = 0 \\ \text{if } V_i > V_{ref,i}, PD_i > 0 \\ \text{the relationship between } V_i \text{ and } PD_i \text{ is linear.} \end{cases}$$

Figure 15:
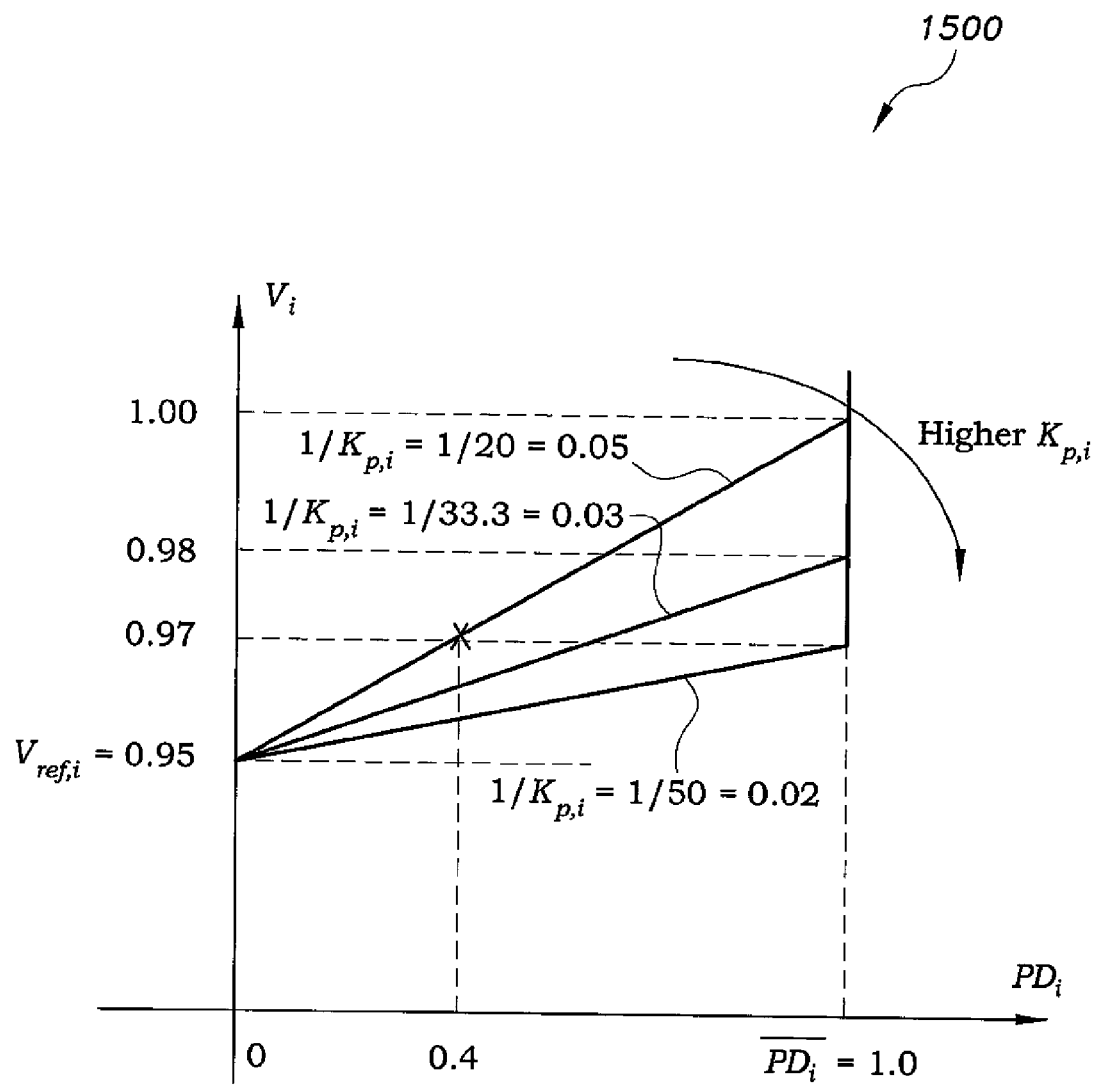
FIG. 15 is a plot showing a comparison of charging rate vs power draw for different proportional gains in an autonomous charging management system for electric vehicles according to the present invention.

Plot 1500 of FIG. 15 shows a group of curves that meet the above mentioned requirements. These curves relate $PD_i$ to $V_i$ as follows:

$$PD_i = \begin{cases} 0 & \text{if } V_i \leq V_{ref,i} \\ K_{p,i}(V_i - V_{ref,i}) & \text{if } V_{ref,i} \leq V_i \leq V_i' \\ 1 & \text{if } V_i \geq V_i' \end{cases} \quad (2)$$

where $V_i' = V_{ref,i} + (1/K_{p,i})$. The gain constant $K_{p,i}$ represents the inverse of the slope of the voltage droop curve. Equation (2) can be thought of as representing the sensitivity of $PD_i$ to the change in voltage from its lower constraint. For example, consider two EVs A and B with two gains $K_{p,A}=20$ and $K_{p,B}=50$. Both EVs are connected to the same POC, whose minimum allowable voltage level is $V_{ref,i}=0.95$ pu. These two EVs may have distinct droop characteristics (top and bottom curves of plot 1500 in FIG. 15) such that if the POC voltage is at or below 0.95 pu, none of the EVs will be charging. However, if the POC voltage is 0.97 pu, EV A will be charging at $PD_A$ of 40% while EV B will be charging at 100%. Note that this still does not guarantee voltage violation due to EV charging, because even if all PDs connected to that POC are set to zero, chances are other EVs at either downstream or upstream nodes are still charging (lack of controllability at the nodal level). Hence, coordinated tuning of $K_{p,i}$ and $V_{ref,i}$ is essential. This coordination is done offline; thus, real-time operation does not require any coordination or communication among the EVs.

A very important aspect of an EV charging strategy is "fairness". That is, the contribution of each EV to mitigate voltage violations should be decided upon in a manner that does not consistently charge an EV significantly slower or faster than another based on their locations in the network. This fairness can be thought of in two directions: horizontal fairness and vertical fairness. Horizontal fairness corresponds to the fact that EVs charging at about the same voltage levels should be charging at similar charging rates $PD_i$. Since $V_{ref,i}$ for all these EVs are approximately the same, horizontal fairness can be achieved by simply setting $K_{p,i}$ of these EVs to be identical. Vertical fairness is related to the level of contribution of EVs connected to POCs at different voltage levels. It is desirable that all EVs connected to the same feeder to have almost equal charging opportunities. That is, it won't be appropriate or acceptable that EVs connected to downstream, i.e. lower voltage POCs suffer from much lower regulated charging rates than those connected to upstream, i.e. higher voltage POCs. Vertical fairness can be assured by adjusting $K_{p,i}$ such that EVs connected to downstream POCs have higher $K_{p,i}$ than those of EVs connected to upstream POCs. Alternatively, according to the present autonomous charging management system for electric vehicles vertical fairness is assured by adjusting $V_{ref,i}$ such that EVs connected to downstream POCs have lower $V_{ref,i}$ than those of EVs connected to upstream POCs. Thus, the $K_{p,i}$ gains of all EVs in the system are set to be identical. According to voltage droop characteristics for different values of $V_{ref,i}$ and one common value of $K_{p,i}=20$, for a common $K_{p,i}$, a higher $V_{ref,i}$ is reflected as an up-shift into the droop curve. Therefore, it is appropriate for downstream nodes to have lower droop characteristics (i.e. lower $V_{ref,i}$) than those of upstream nodes.

The basis for selecting the nodal voltage set points is that EVs connected across the distribution system contribute almost equally, irrespective of their charging point location, in order to avoid any network violations. If all voltage set points are set identically, the EVs connected to downstream POCs (or those connected to the primary nodes through long secondary wiring) will generally be at disadvantage compared with those connected to upstream POCs (or have short secondary wiring). Therefore, as a general rule of thumb, the more downstream the POC is, the lower the voltage set point should be. A first method for selecting these voltage set points to achieve that goal uses an iterative method on the voltage set points. For a typical daily load profile, distribution power flow is run and voltages are observed. Based on the observed voltage levels, a set of voltage set points for the EVs is selected. Then, If $PD_i$ for a certain EV is unreasonably high (low), the corresponding $V_{ref,i}$ is raised (lowered). $V_{ref,i}$ values are adjusted until $PD_i$'s of all EVs across the system are at comparable levels.

A second voltage set point selection method is a moving average method. At each EV point of charging i, the value of the daily minimum voltage $V_{min,d,i}$ is tracked. This typically is associated with the daily peak period. These minimum voltage values are averaged out for the past several days. This average value is then used as a voltage set point, or a voltage reference, $V_{ref,i}$, for the $i^{th}$ EV. This reference voltage needs to be constrained by the minimum permissible voltage level. That is, $$V_{ref,i} = \max\left(\frac{1}{D}\sum_{d=1}^{D} V_{min,d,i}, 0.952\right) \quad (3)$$

where D is the number of days. A value of 0.002 pu is added to the minimum permissible voltage level as a safety margin. The advantage of this method over the first method is that it is simple and systematic. For example, to calculate the voltage reference values, at each node, the average voltage levels during peak periods for the last fourteen days are used as voltage set points. This is a simple and systematic method that does not require any communication with the utility company. Moreover, it is observed that using the moving average of the daily minimum voltages has the tendency of dragging $V_{ref}$ at the POCs with low voltages further down over time. This condition can be prevented by constraining $V_{ref}$ at all POCs. In this case study, $V_{ref}$ is limited to be above 0.952. This effectively solves the voltage dragging issue not only at the low-voltage POCs but also at the higher voltage ones.

An additional property that can be added to the control scheme is the dependence of the charging rate on the EV battery SOC. This can be included by multiplying the controller gain by $(1-SOC_{pu,i})$, where $SOC_{pu,i}=SOC_i/BattCap_i$. This term will bias the effective controller gains more towards the least charged EVs and less towards the most charged EVs. It is assumed that all EVs in the system share the same value for the set of proportional gains $K_{p,i}$. Therefore, the EVs connected to downstream POCs will generally be at disadvantage. For P-control, therefore, the voltage droop characteristics are parallel lines shifted vertically according to their vertical intercepts $V_{ref,i}$. Multiplying the controller proportional gain of the $i^{th}$ EV by $(1-SOC_{pu,i})$ effectively changes the slope of the droop characteristic of that EV without changing the vertical intercept. Therefore, for EVs with the same reference voltage, the ones with the higher state of charge will charge at a lower rate than those with the lower state of charge.

The control scheme can be further modified in order to include any possible preference of an end-of-charge time (ECT) for the EV owner. This is done by limiting the EV power draw to a value that is dependent on the remaining uncharged battery capacity. Thus, the minimum power draw for each EV is defined as the average value required over the remaining charging interval. That is, for an EV with a current state of charge of SOC(t) and a total battery capacity of $BattCap_i$, the power draw is modified to:

$$PD_i = \begin{cases} 0 & \text{if } V_i \leq V_{ref,i} \\ PD_i^* & \text{if } V_{ref,i} \leq V_i \leq V_i' \\ 1 & \text{if } V_i \geq V_i' \end{cases} \quad (4)$$

where, $$PD_i^* = \max\{K_{p,i}(V_i-V_{ref,i}), (BattCap_i-SOC(t))/(d-t)\} \quad (5)$$

and d is the preferred total charge time (in hours). Note that this additional term cannot guarantee that the EV will charge fully before the ECT. This is because the $PD_i^*$ term in (4) applies only when the POC voltage is higher than $V_{ref,i}$, otherwise $PD_i$ will be set to zero. However, careful selection of the gain value maximizes the likelihood of achieving this desirable feature. This control scheme can readily be extended to perform bi-directional power flow for a very simple V2G. In that case the control scheme is characterized by the relation:

$$PD_i = K_{p,i}(V_i-V_{ref,i}) \text{ if } V_i \leq V_{ref,i} \quad (6)$$

This would allow $PD_i$ to take negative values, meaning battery discharging, if $V_i<V_{ref,i}$. In addition, an aggregator could sell the combined voltage regulation services of the EVs equipped with this charge control to the distribution system operator if the aggregator were the one who placed the circuits in the EVs in the first place. However, a full unidirectional or bidirectional V2G scheme, which includes performing regulation, spinning reserves, and potentially energy arbitrage is impossible in this configuration due to the lack of real-time communications to a centralized controller/aggregator.

Figure 2:
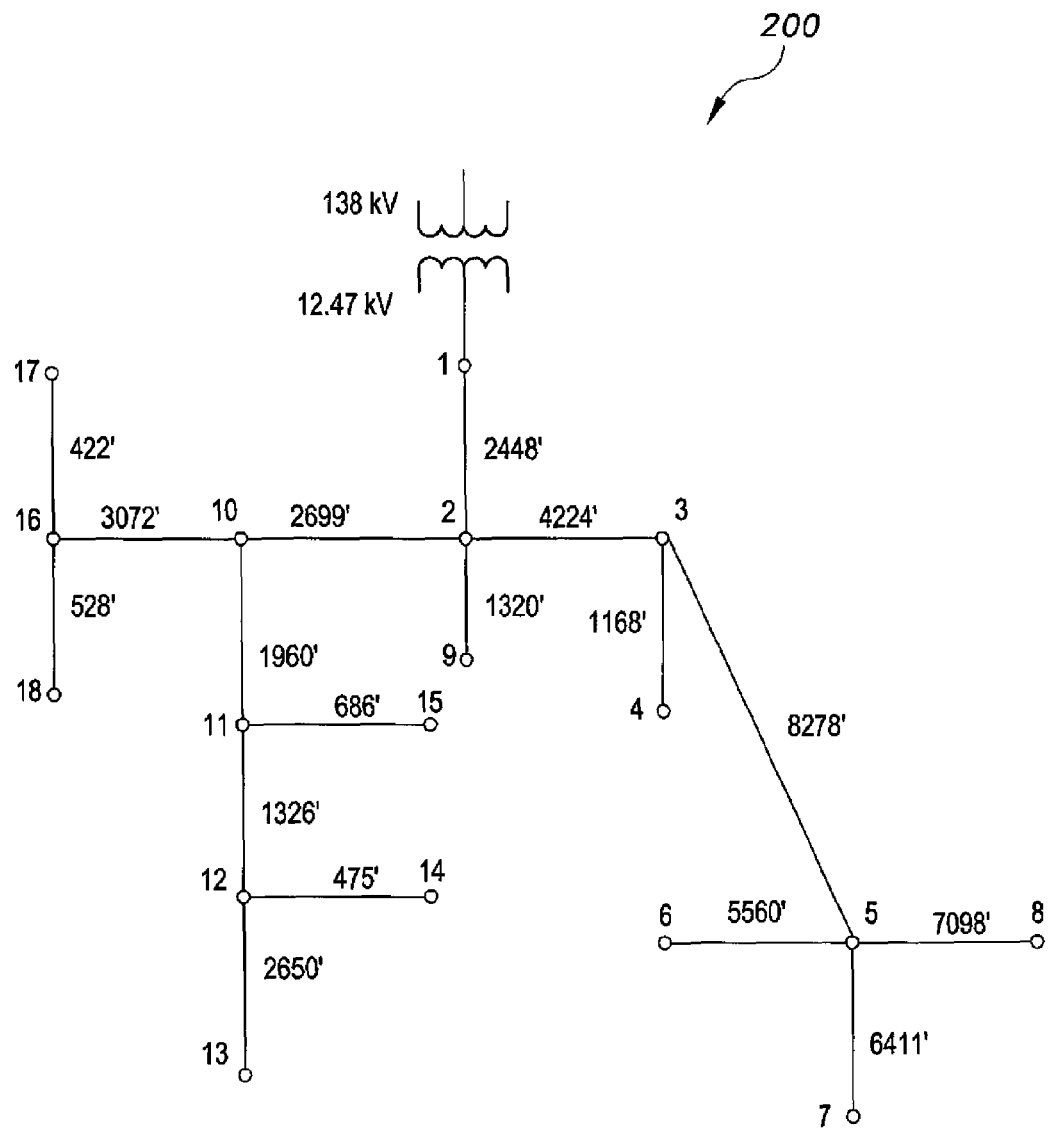
FIG. 2 is a schematic diagram of a distribution feeder test system for testing an autonomous charging management system for electric vehicles according to the present invention.

The primary distribution test system 200 used for simulating the EV charging impacts is shown in FIG. 2. This system is commonly used for EV charging impact studies, microgrid studies, and the like. The primary distribution system operates at a nominal 12.47 kV line-to-line voltage. The conductors are organized in a symmetric geometry with a geometric mean spacing of 4.69 ft. Every load bus has 20 houses connected to each secondary phase. The load profile for each house is based on historical Residential High Winter Ratio (ResHiWR) load profiles found in the ERCOT system with one-hour resolution. The parameters of the distribution system are found in Table 1.

TABLE 1

Distribution System Parameters

| | |
|---|---|
| Phase Conductor: | ACSR 2 |
| Neutral Conductor: | ACSR 4 |
| Max Amps: | 180 |
| Houses | 1020 |

A 50% EV penetration level is assumed. This level is chosen because it has been shown to cause significant problems with EV charging. Each EV has a maximum charge rate of 6.6 kW and a charge capacity of 24 kWh. The average initial state of charge of each EV is assumed to be about 40% of the battery's full capacity. The EVs are assumed to be plugged in from 5 pm to 5 am.

An RTDS is a powerful computer that accomplishes the task of real time simulation via parallel computing. Using trapezoidal integration and exploiting the delay in travelling waves on transmission lines, the system is capable of performing time domain simulation at real-time speed using time steps less than 50 micro seconds. These small time steps enable the RTDS to accurately and reliably simulate power system phenomena in the range of 0 to 3 kHz. There are several levels of software involved with the RTDS simulator. At the lower level are the component models that have been optimized for real time operation. The highest level of software is the graphical user interface (GUI) known as RSCAD which allows simulation circuits to be constructed, run, operated, and results to be recorded and documented.

The voltage feedback charging strategy is simulated on RTDS platform to check for its applicability in real time system. The scripting feature of RSCAD (software to interface with RTDS) has been used to perform simulations for 12 hours. The distribution system and controller are configured taking into account memory limitations and to suppress any undesired fluctuations in controller response.

Six nodes (Node # 2, 5, 6, 7, 8 & 10) have been modeled by unbalanced single phase loads. The remaining nodes are modeled with three phase balanced loads.

Figure 3:
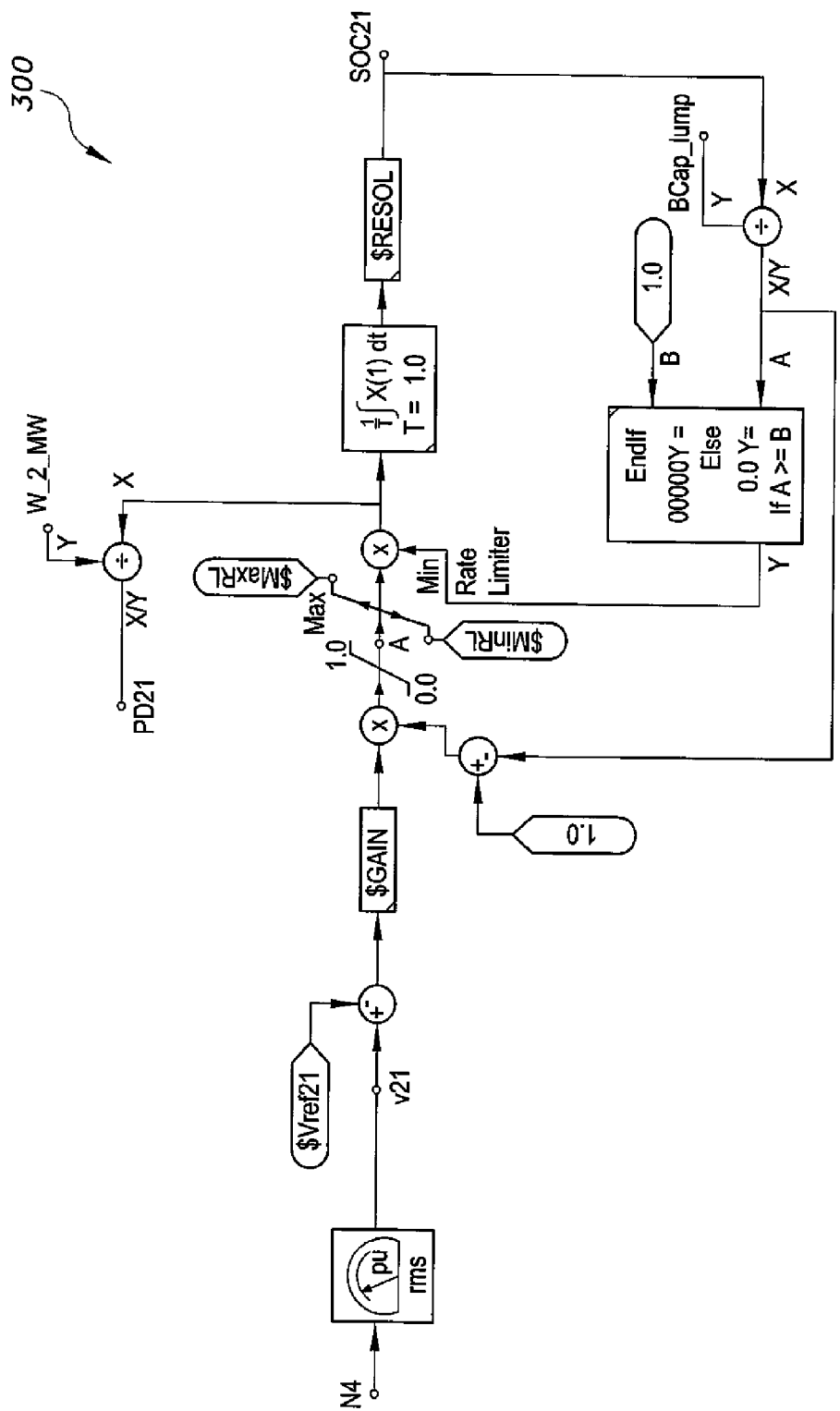
FIG. 3 is a block diagram of the analog controller action at each phase for nodes with unbalanced loads in a real time digital simulator of an autonomous charging management system for electric vehicles according to the present invention.

For nodes with unbalanced loads, all N, e.g., ten EVs on each phase are lumped together in "a super EV". The initial SOC of the super EV is obtained by adding up the initial SOCs of the individual EVs at that phase. A single controller 300 is assumed to control the super EV, as shown in FIG. 3.

Figure 4:
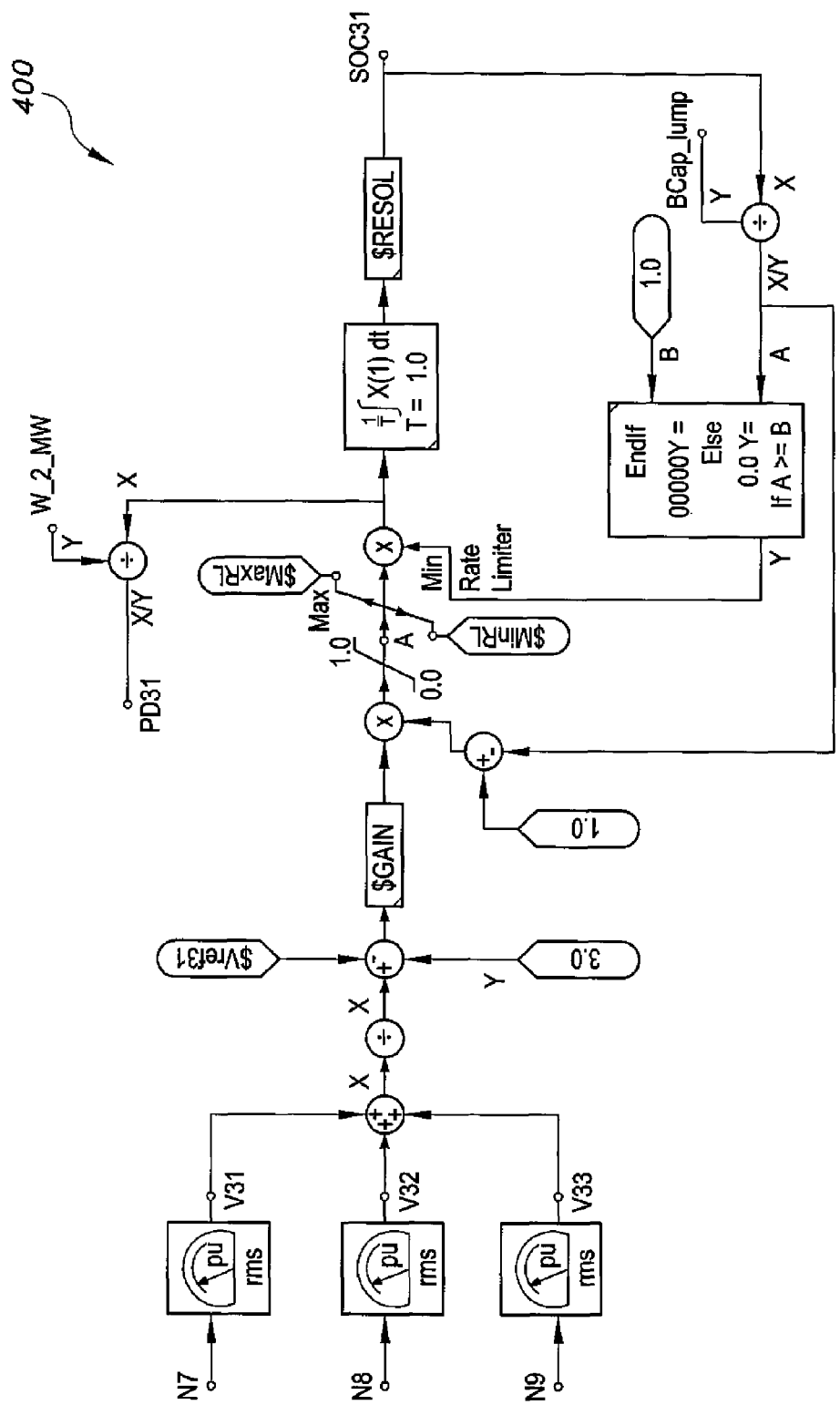
FIG. 4 is a block diagram of the analog controller action at each phase for nodes with balanced loads in a real time digital simulator of an autonomous charging management system for electric vehicles according to the present invention.

For nodes with balanced loads, initial SOCs are added for every N, e.g., ten EVs per phase and then the resultant three lumped SOCs are averaged out. Finally a single balanced loads controller 400 is implemented, as shown in FIG. 4.

In order to suppress any possible undesirable oscillations in the controller response, a rate limiter is applied to the EV power draw signal of the charge controller. The maximum rate limit is fixed at 100% of EV power draw because in RTDS every simulation run gives a transient response at the initial instant which is a very low value and then it gradually builds up to attain the actual value. This change was found to be from 0 to 100% of PD and hence RLmax fixed as 100%. Now in absence of lower limit or a very high value of lower limit of 100% causes abrupt fluctuations in power draw signal which affected the voltage profile and sometimes the voltage falls below to the set point. Hence, various values are tried between 1% and 100%. By trial and error 50% was found to be the maximum value at which considerable reduction in fluctuations took place. While minimum value was found to be 5% that causes much improved performance and overall flatter power draw signal for specified hour. Values are also tested below 5% but they did not show much improvement.

Figures 5A, 5B:
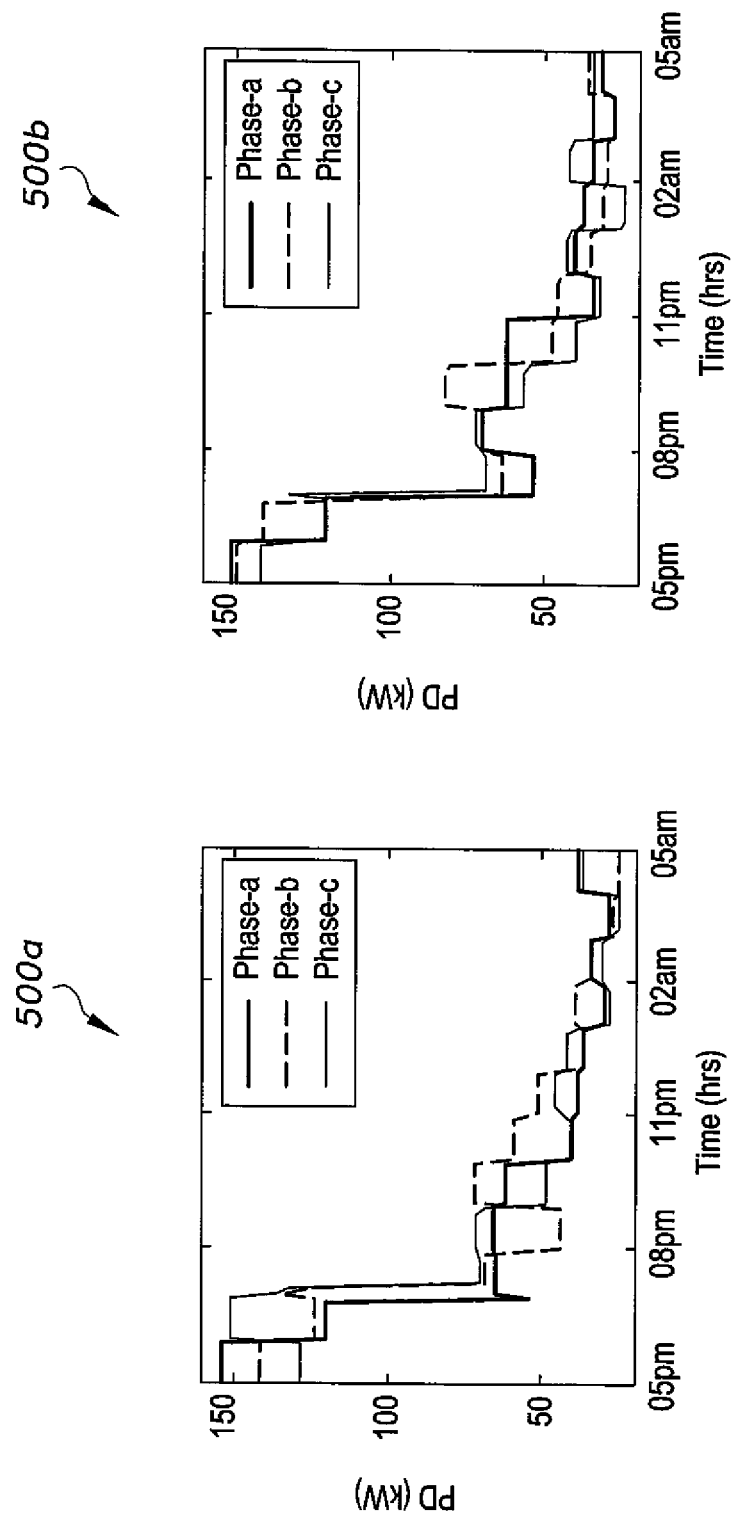
FIG. 5A is a plot showing a simulation of the total load as a function of time at node 2 assuming opportunistic charging (charging at the maximum charging rate when the EV is plugged in at 5:00 p.m.).
FIG. 5B is a plot showing a simulation of the total load as a function of time at node 6 assuming opportunistic charging (charging at the maximum charging rate when the EV is plugged in at 5:00 p.m.).
Figure 6B:
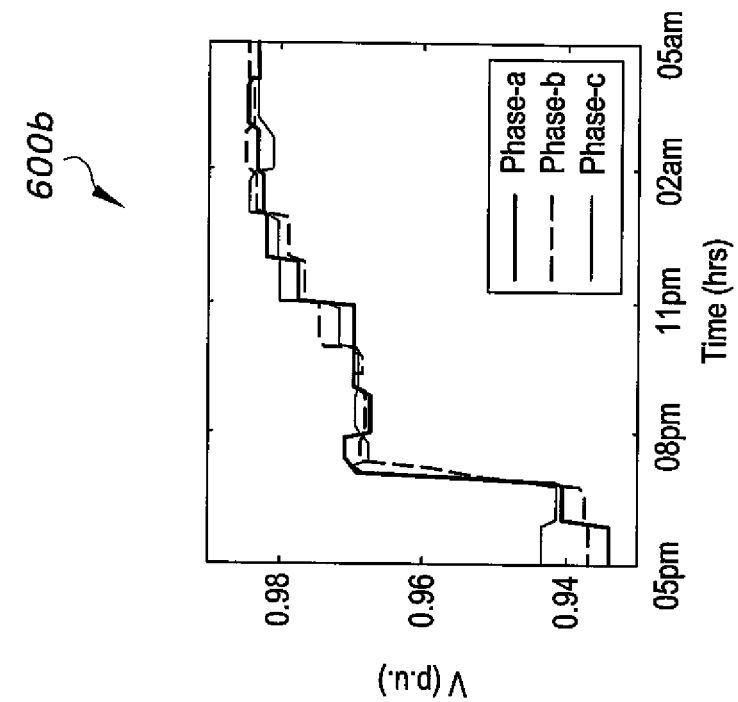
FIG. 6B is a plot showing simulation of voltage profiles as a function of time at node 6, assuming opportunistic charging (charging at the maximum charging rate when the EV is plugged in at 5:00 p.m.).
Figure 6A:
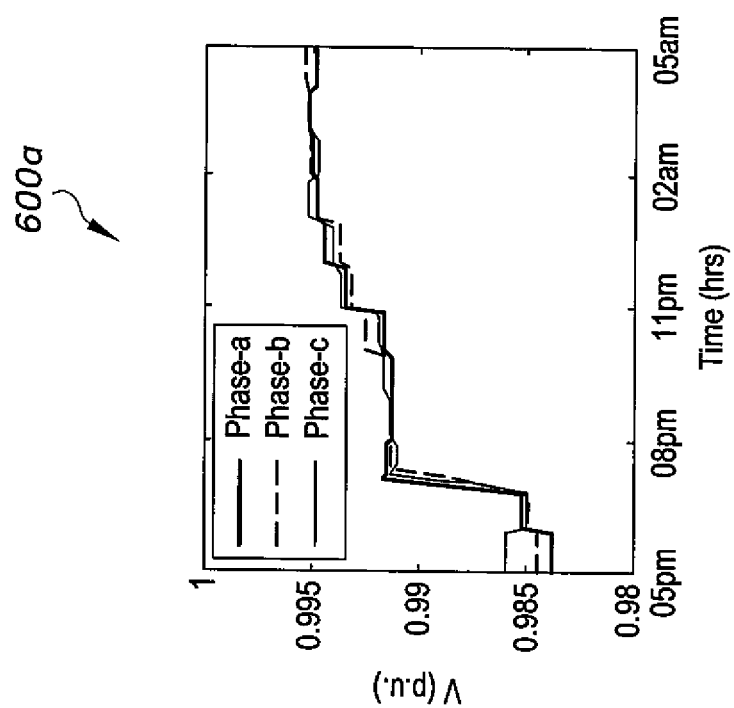
FIG. 6A is a plot showing simulation of voltage profiles as a function of time at node 2, assuming opportunistic charging (charging at the maximum charging rate when the EV is plugged in at 5:00 p.m.).

In opportunistic charging, the EVs are assumed to be charging at maximum charging rate as soon as they are plugged in, i.e. at 5 pm. In the first few hours of charging, a significant jump in the total load and, consequently, an undesirable voltage dip below 0.95 pu, are observed, as seen in plots 500a and 500b of FIGS. 5A and 5B and plots 600a and 600b of FIGS. 6A and 6B.

Figure 7B:
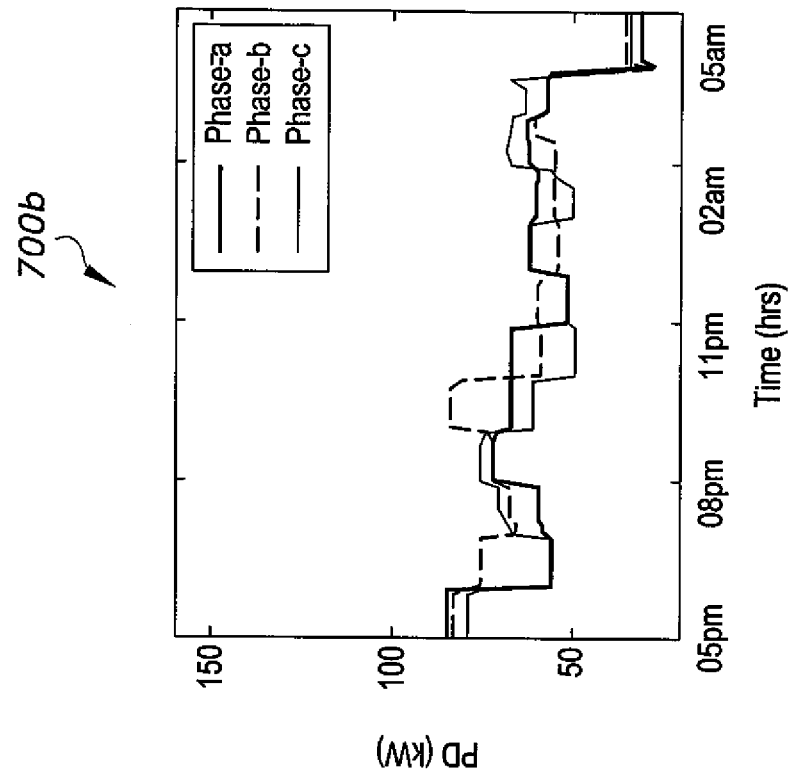
FIG. 7B is a plot showing simulation of the total load as a function of time at node 6 assuming basic proportional charging (0.955 pu voltage reference, proportional gain of 50 for all EVs) for an autonomous charging management system for electric vehicles according to the present invention.
Figure 7A:
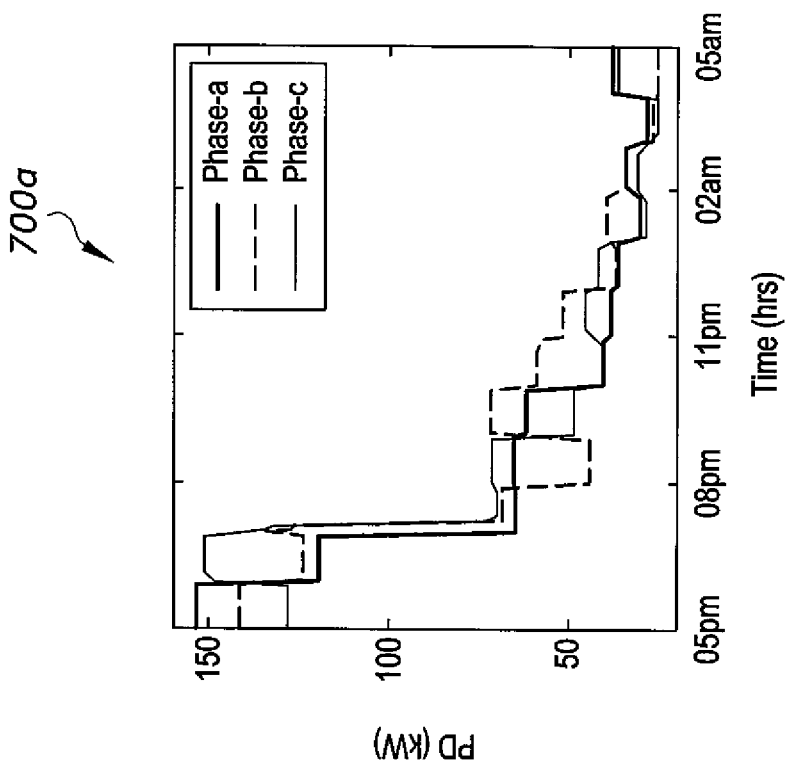
FIG. 7A is a plot showing simulation of the total load as a function of time at node 2 assuming basic proportional charging (0.955 pu voltage reference, proportional gain of 50 for all EVs) for an autonomous charging management system for electric vehicles according to the present invention.
Figure 8B:
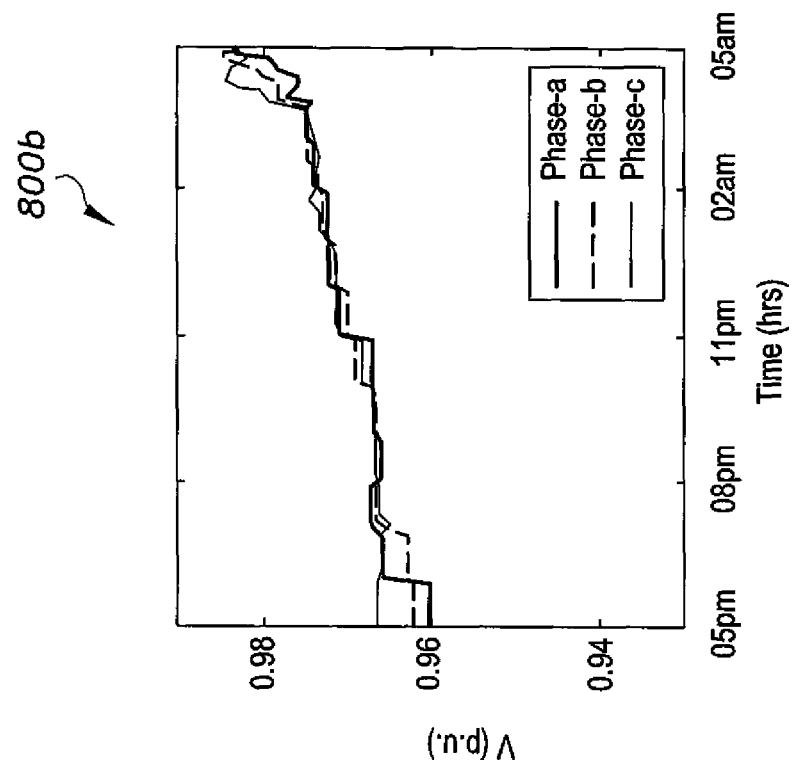
FIG. 8B is a plot showing simulation of voltage profiles as a function of time at node 6 assuming basic proportional charging (0.955 pu voltage reference, proportional gain of 50 for all EVs) for an autonomous charging management system for electric vehicles according to the present invention.
Figure 8A:
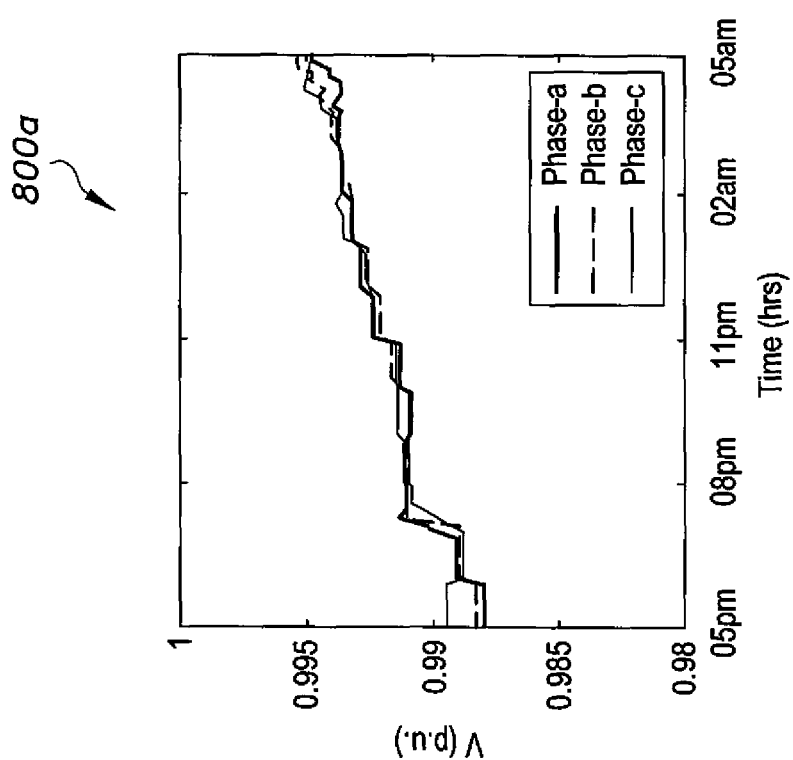
FIG. 8A is a plot showing simulation of voltage profiles as a function of time at node 2 assuming basic proportional charging (0.955 pu voltage reference, proportional gain of 50 for all EVs) for an autonomous charging management system for electric vehicles according to the present invention.
Figure 9B:
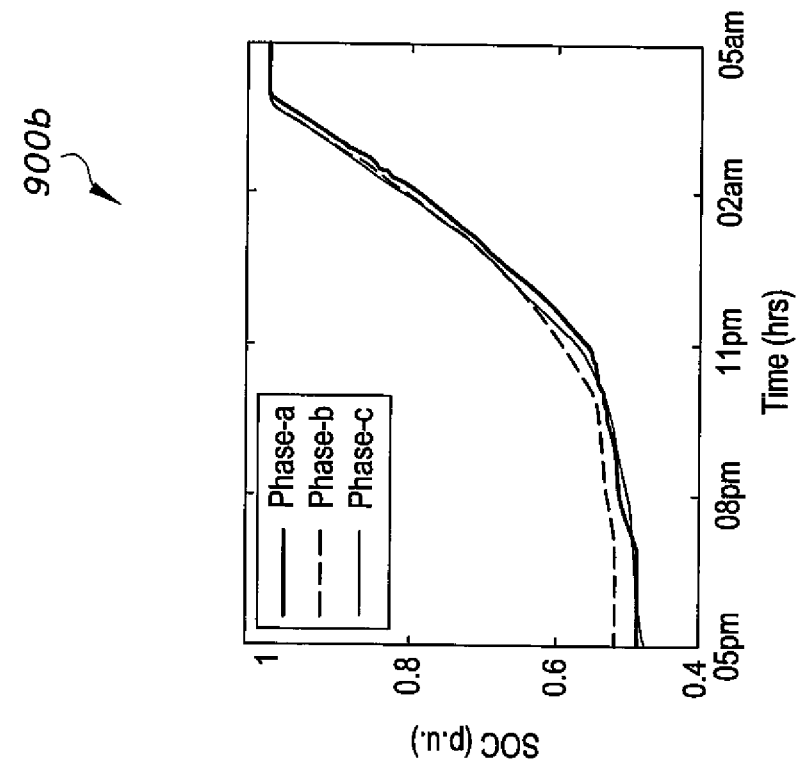
FIG. 9B is a plot showing simulation of average SOC as a function of time at node 6, assuming basic proportional charging (0.955 pu voltage reference, proportional gain of 50 for all EVs) for an autonomous charging management system for electric vehicles according to the present invention.
Figure 9A:
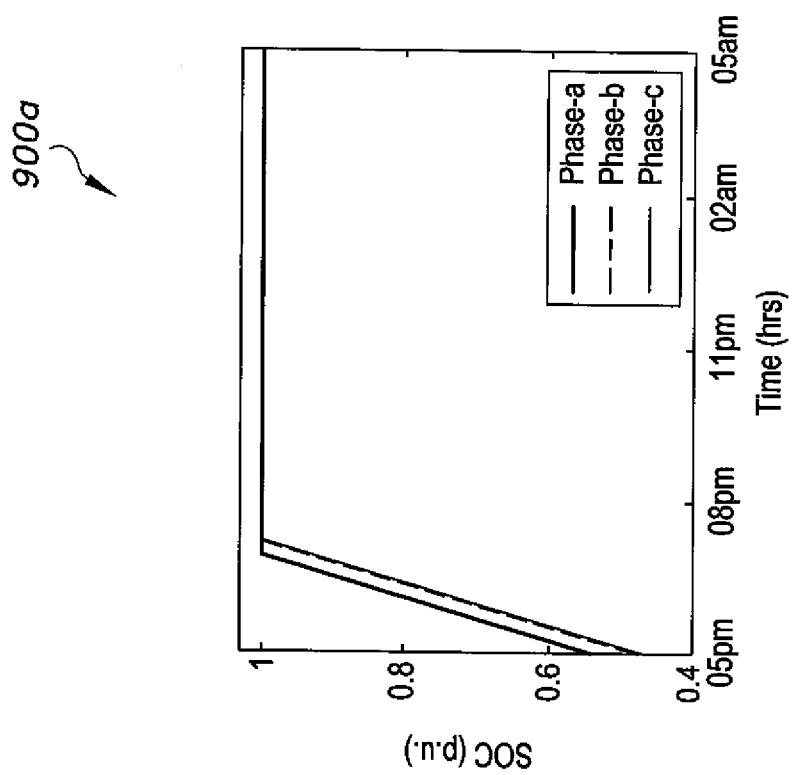
FIG. 9A is a plot showing simulation of average SOC as a function of time at node 2, assuming basic proportional charging (0.955 pu voltage reference, proportional gain of 50 for all EVs) for an autonomous charging management system for electric vehicles according to the present invention.

In the case of charging using basic proportional control the voltage set points of all nodes in the system are set at a flat voltage reference of 0.955 pu. After several trials, the proportional gain is set to 50 for all EVs. At this value of gain, all EVs are charged fully before the end of the charging period, i.e. before 5 a.m. Plots 700a and 700b of FIGS. 7A and 7B, plots 800a and 800b of FIGS. 8A and 8B, and plots 900a and 900b of FIGS. 9A and 9B clearly show the effectiveness of this simple, distributed control scheme on enhancing the voltage profiles, especially at the downstream nodes.

With respect to fair, SOC-dependent charging, upstream node voltage reference values should be set at higher levels than those of the downstream nodes to improve the charging fairness. The voltage set points for fair charging for phases A, B, and C shown in Table 2 were calculated using the moving average method. An important advantage of using moving average set points is that it will still provide fairness when capacitors and other voltage control devices are in use in the system and it adjusts locally for seasonal load variations. Fairness is improved even further by making the proportional gain a function of the battery SOC. The effective gain linearly decreases as $SOC_{pu,i}$ increases. Because of this SOC-dependency factor and because most of the voltage references are now higher than 0.955, $K_p$ should be set at a much higher value than that of the flat $V_{ref}$ case in order to ensure that EVs fully charge before the end of the charging period.

TABLE 2

Voltage Set Points for Fair Charging for Phases A, B, and C

| Node | Set Point |
|---|---|
| 1 | |
| 2 | 0.9912, 0.9915, 0.9913 |

TABLE 2-continued

Voltage Set Points for Fair Charging for Phases A, B, and C

| Node | Set Point |
|---|---|
| 3 | 0.9832, 0.9838, 0.9834 |
| 4 | 0.9830, 0.9837, 0.9833 |
| 5 | 0.9691, 0.9704, 0.9697 |
| 6 | 0.9668, 0.9680, 0.9674 |
| 7 | 0.9662, 0.9678, 0.9672 |
| 8 | 0.9659, 0.9675, 0.9664 |
| 9 | 0.9911, 0.9913, 0.9912 |
| 10 | 0.9878, 0.9881, 0.9879 |
| 11 | 0.9868, 0.9870, 0.9869 |
| 12 | 0.9864, 0.9866, 0.9865 |
| 13 | 0.9861, 0.9863, 0.9862 |
| 14 | 0.9863, 0.9866, 0.9864 |
| 15 | 0.9867, 0.9870, 0.9868 |
| 16 | 0.9869, 0.9871, 0.9870 |
| 17 | 0.9868, 0.9870, 0.9869 |
| 18 | 0.9868, 0.9870, 0.9869 |

The differences in charging time among EVs connected to the same node as well as among EVs connected at different nodes can also be reduced by making the proportional gain a function of the battery SOC. The effective proportional gain linearly decreases as SOCpu, i increases. Therefore, Kp has to be set at a higher value than that of the basic proportional control.

Figure 10B:
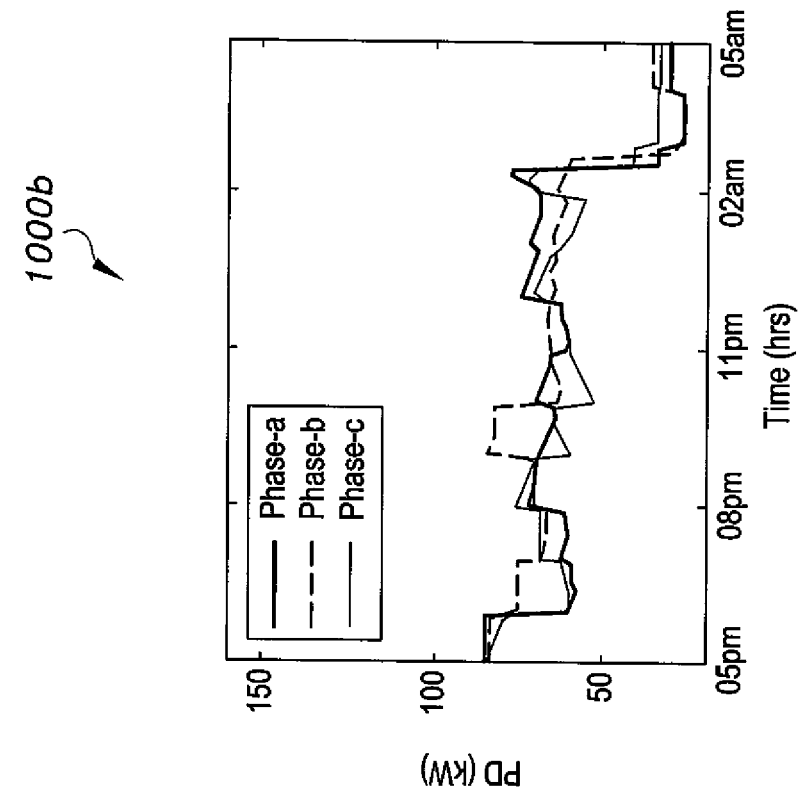
FIG. 10B is a plot showing simulation of the total load as a function of time at node 6, assuming fair SOC-dependent charging (SOC-dependent proportional gain with $K_p$=4000) for an autonomous charging management system for electric vehicles according to the present invention.
Figure 10A:
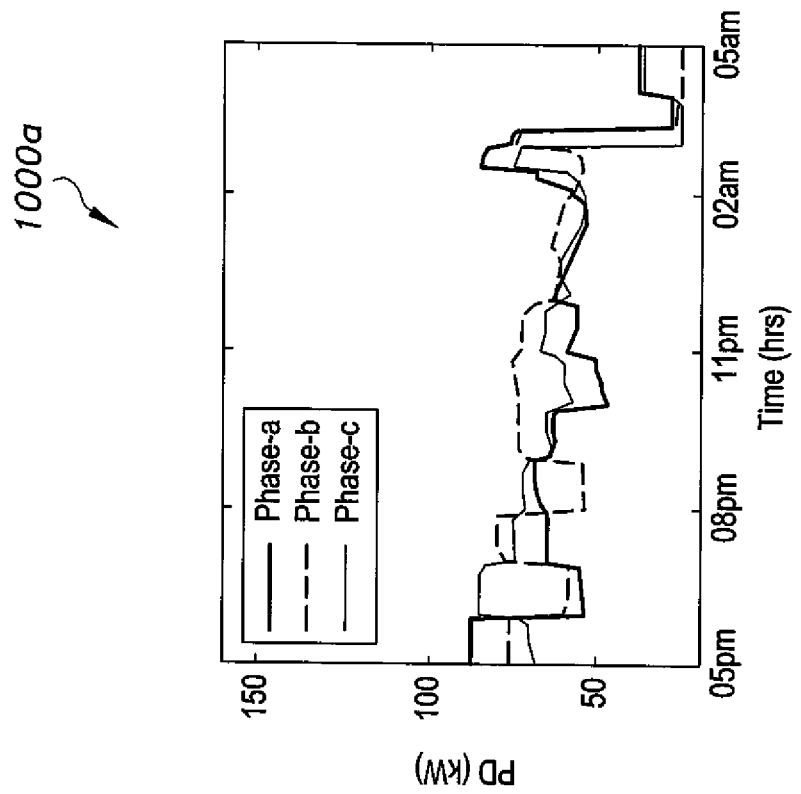
FIG. 10A is a plot showing simulation of the total load as a function of time at node 2, assuming fair SOC-dependent charging (SOC-dependent proportional gain with $K_p$=4000) for an autonomous charging management system for electric vehicles according to the present invention.
Figures 11A, 11B:
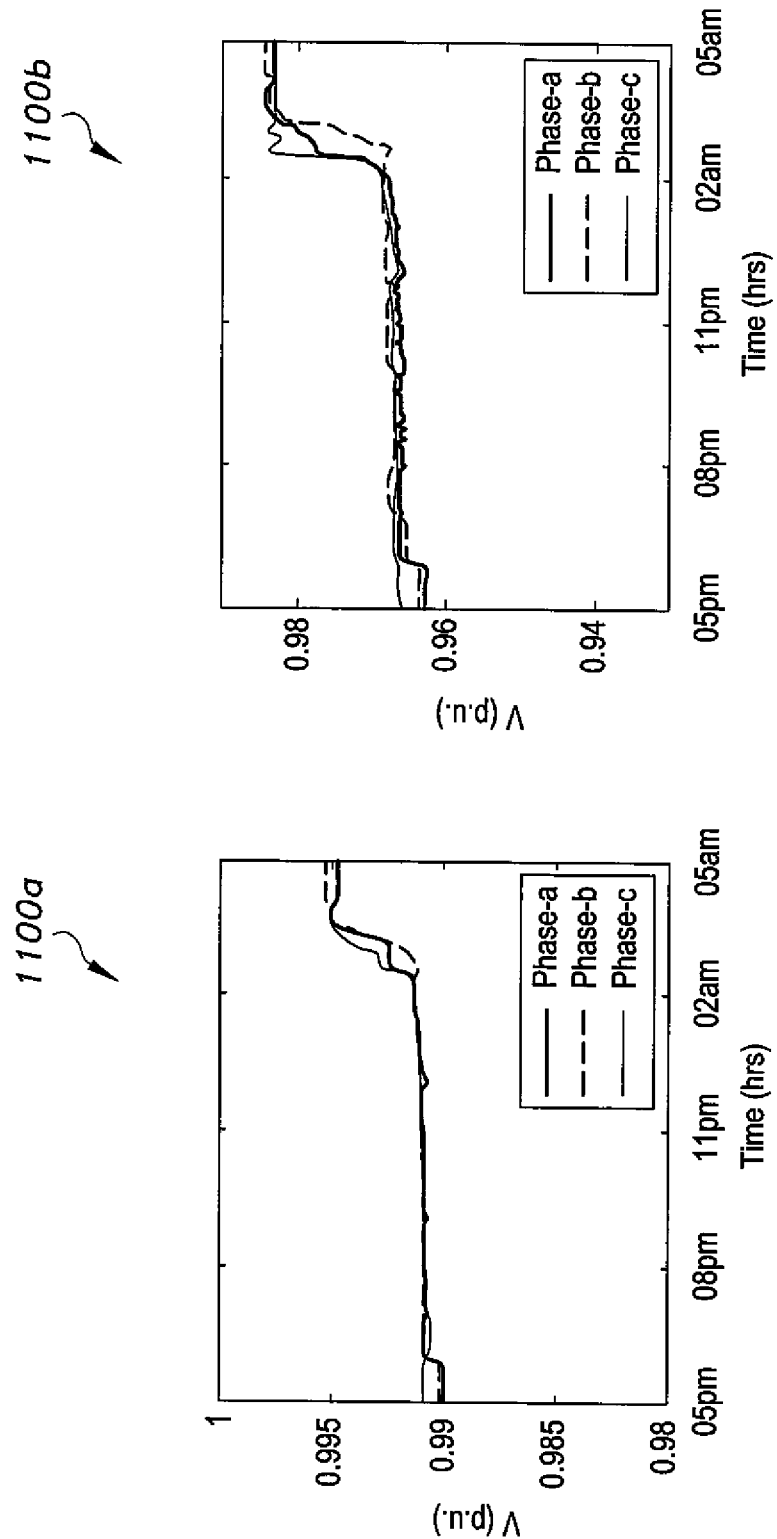
FIG. 11A is a plot showing simulation of voltage profile as a function of time at node 2, assuming fair SOC-dependent charging (SOC-dependent proportional gain with $K_p$=4000) for an autonomous charging management system for electric vehicles according to the present invention.
FIG. 11B is a plot showing simulation of voltage profile as a function of time at node 6, assuming fair SOC-dependent charging (SOC-dependent proportional gain with $K_p$=4000) for an autonomous charging management system for electric vehicles according to the present invention.
Figure 12B:
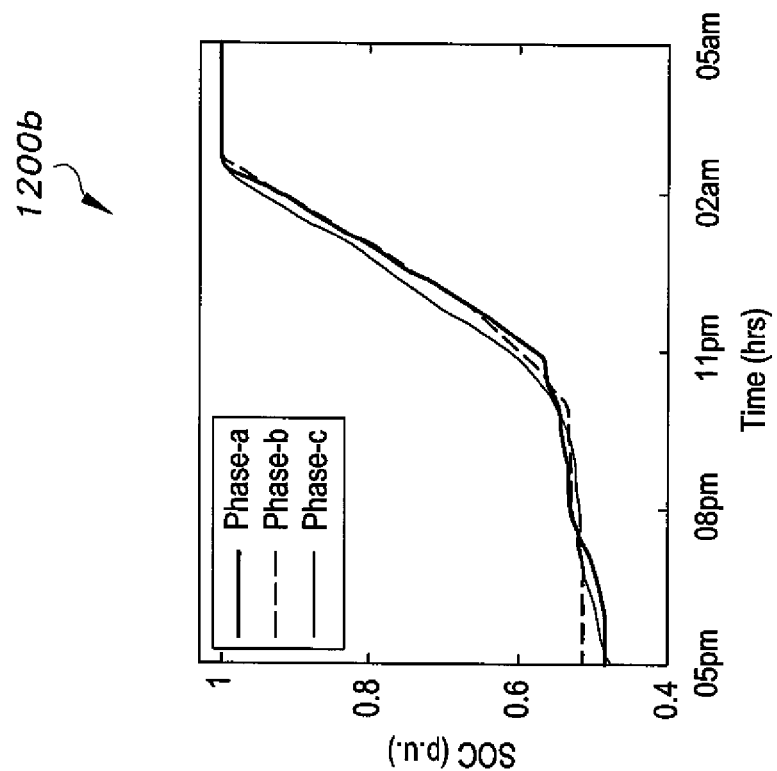
FIG. 12B is a plot showing simulation of average SOC as a function of time at node 6, assuming fair SOC-dependent charging (SOC-dependent proportional gain with $K_p$=4000) for an autonomous charging management system for electric vehicles according to the present invention.
Figure 12A:
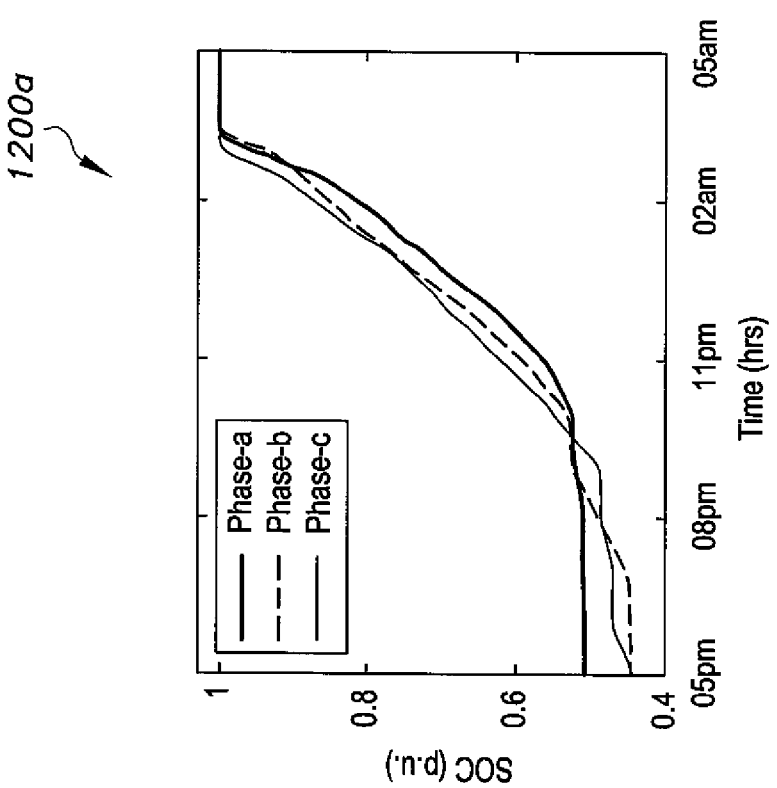
FIG. 12A is a plot showing simulation of average SOC as a function of time at node 2, assuming fair SOC-dependent charging (SOC-dependent proportional gain with $K_p$=4000) for an autonomous charging management system for electric vehicles according to the present invention.

Plots 1000a and 1000b of FIGS. 10A and 10B, plots 1100a and 1100b of FIGS. 11A and 11B, and plots 1200a and 1200b of FIGS. 12A and 12B show the nodal loads, nodal voltage profiles and nodal average SOC at nodes 2 and 6, due to the use of an SOC-dependent proportional gain with Kp=4000. The results show that SOC-dependent proportional charging not only improves fairness among EVs across the distribution system, but also results in flatter voltage profiles and flatter total system load profile. This is because SOC-dependency makes the effective gains decrease gradually as $SOC_{pu}$ gets higher. While the focal point of the present scheme is the distribution system, these load profiles indicate that this new scheme also benefits the bulk power system by shaving the evening peak load through delaying some of the EV charging load to night and early morning hours.

Table 3 summarizes the comparison in performance among the two different voltage feedback control cases: using flat reference voltages (Kp=50) and using SOC-dependent fair charging (Kp=4000). The results in Table 3 indicate the superiority of SOC-dependent charging in terms of closing the gap between the earliest and the latest times to full charge. Note that only the results corresponding to nodes 2 and 6 are shown. This is because they are the most extreme nodes in terms of the required time to full charge.

TABLE 3

Comparison in Terms of Average Time to Full Charge

| Control Scheme | Average time at Node 2 (hr) | | | Average time at Node 6 (hr) | | | Difference between earliest and latest (hr) |
|---|---|---|---|---|---|---|---|
| | Phase a | Phase b | Phase c | Phase a | Phase b | Phase c | |
| Flat $V_{ref}$ | 2.1 | 2.3 | 2.3 | 11 | 10.9 | 10.9 | 8.9 |
| SOC-dependent | 10.4 | 10.4 | 10.1 | 9.7 | 9.9 | 9.7 | 0.7 |

Taking all considerations into account, a value of Kp=2000 is recommended for this system. This gain value gives charging that is reasonably fast with voltage profiles that are reasonably flat. The transition from period of intense charging to the period of no charging is acceptably smooth. In addition, within the scenarios of various perturbations investigated, no stability issues in voltage are observed. Although multiple tests are required to ensure proper controller tuning, one important advantage of this control scheme is that it consists of only a single parameter to be tuned. This simplifies the tuning process.

Figure 13:
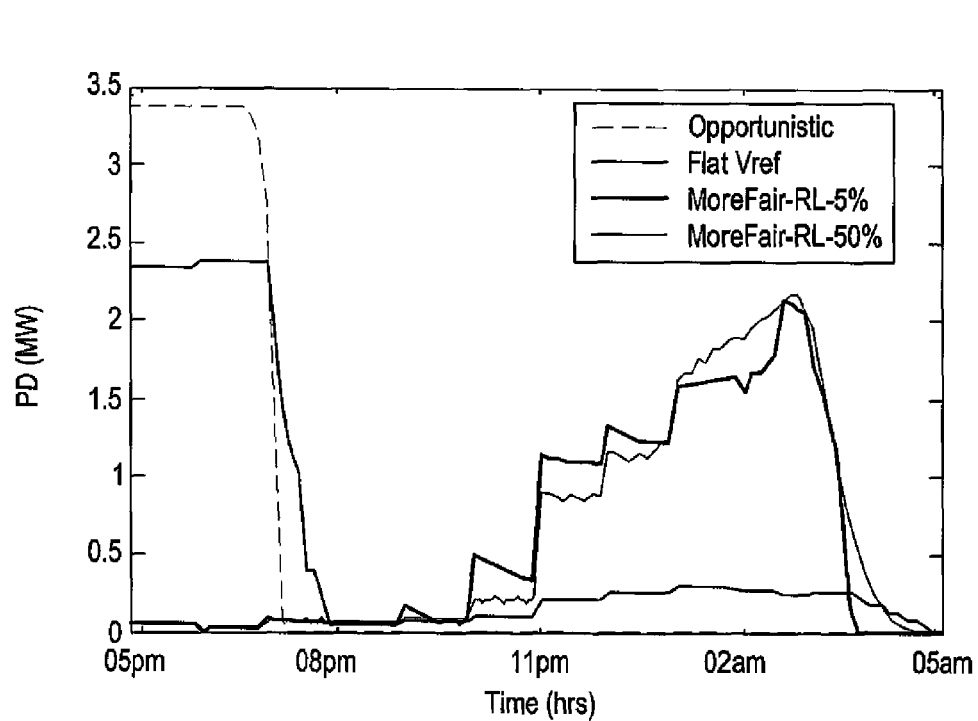
FIG. 13 is a plot showing simulation results comparing aggregate EV charging load for the distribution system for different charging schemes in an autonomous charging management system for electric vehicles according to the present invention.
Figure 14:
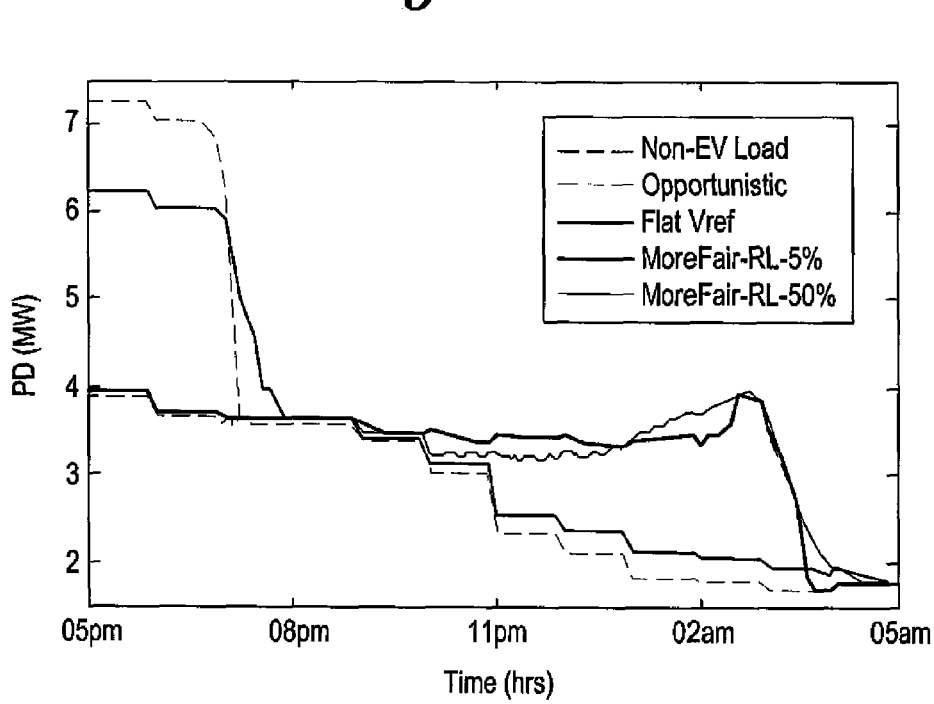
FIG. 14 is a plot showing simulation results comparing total EV+non EV load for the distribution system for different charging schemes in an autonomous charging management system for electric vehicles according to the present invention.

Plots 1300 and 1400 of FIGS. 13 and 14, respectively, show a comparison in terms of the aggregate EV load and the total (EV and non-EV) load of the distribution system. The results demonstrate the effectiveness of the proposed control schemes in flattening the distribution system load profile. Moreover, as demonstrated in plots 1300 and 1400, limiting the drop in power draw to 5% actually results in a flatter load profile and also charges the EVs more quickly as compare to 50%. The reduction in rate limit also attains a more stable voltage profile at the nodes which helps to stabilize the system.

Functionality of the present autonomous charging management system for electric vehicles was verified over RTDS. This control scheme, though communication-free, effectively coordinates charging among the EVs connected to the distribution nodes in a fair manner so that voltage violations are avoided. The new scheme also results in a flattened EV charging profile. This is simulated over Real Time Digital Simulator in order to test its real time performance and the results clearly justify its real time implementation. Though some communication with the distribution service operator might be required in order to set the gains after planning studies, this would be a monthly to yearly operation. It will require no real-time communication and will thus not present a significant cost. Additionally, it will be understood that the diagrams in the Figures depicting the autonomous charging management system for electric vehicles are exemplary only, and may be embodied in a dedicated electronic device having a microprocessor, microcontroller, digital signal processor, application specific integrated circuit, field programmable gate array, any combination of the aforementioned devices, or other device that combines the functionality of the autonomous charging management system for electric vehicles onto a single chip or multiple chips programmed to carry out the method steps described herein, or may be embodied in a general purpose computer having the appropriate peripherals attached thereto and software stored on a computer readable media that can be loaded into main memory and executed by a processing unit to carry out the functionality of the present apparatus and steps of the method described herein.

It is to be understood that the present invention is not limited to the embodiments described above, but encompasses any and all embodiments within the scope of the following claims.

We claim:

1. An autonomous charging management system for electric vehicles (EVs), comprising:
means for tracking the value of a daily minimum voltage $V_{min,d,i}$ at each EV point of charging ($POC_i$);
for each point of charging ($POC_i$), a proportional controller regulating power draw $PD_i$ by an EV connected at the point of charging ($POC_i$), the proportional controller having a SOC-dependent fair charging gain constant $K_p$ set between ($K_p \cong 2000$) and ($K_p \cong 4000$);
means for formulating an average using a plurality of values of the daily minimum voltage $V_{min,d,i}$;
means for using the average as a voltage set point for the proportional controller, the voltage set point representing a voltage reference, $V_{ref,i}$, for the $i^{th}$ EV characterized by the relation:

$$V_{ref,i} = \max\left(\frac{1}{D}\sum_{d=1}^{D} V_{min,d,i}, 0.952\right),$$

where D represents a total number of days; and
means for setting a feedback gain of the proportional controller based on a state of charge ($SOC_i$) and battery capacity ($BattCap_i$) of the connected EV, the proportional controller reducing the EV charging as a charging point voltage $V_i$ approaches the reference voltage $V_{ref,i}$.

2. The autonomous charging management system for electric vehicles according to claim 1, wherein the proportional controller further comprises means for regulating a charging rate, $ID_i$, over a wide range of nodal voltage levels according to a formula characterized by the relation:

$ID_i = K_{p,i} * (V_i - V_{ref,i})$, where $K_{p,i}$ is the proportional control gain for the $i^{th}$ EV, $V_{ref,i}$ is the reference voltage level for the $i^{th}$ EV in per unit (pu), and $V_i$ is the actual real-time voltage in p.u. at the charging point.

3. The autonomous charging management system for electric vehicles according to claim 2, wherein the proportional controller power draw regulation further comprises means for adjusting the power draw $PD_i$ for charging the $i^{th}$ EV according to a formula characterized by the relation:

$$PD_i = \begin{cases} 0 & \text{if } V_i \leq V_{ref,i} \\ PD_i^* & \text{if } V_{ref,i} \leq V_i \leq V_i' \\ 1 & \text{if } V_i \geq V_i' \end{cases}$$

where
$PD_i^* = \max\{K_{p,i}(V_i - V_{ref,i}), (BattCap_i - SOC(t))/(d-t)\}$,
$V_i' = V_{ref,i} + (1/K_{p,i})$, and d is a preferred total charge time (in hours).

4. The autonomous charging management system for electric vehicles according to claim 1, further comprising for a node with balanced loads, means for adding initial SOCs for every N charging EVs per phase, the resultant three lumped SOCs being averaged out for nodes with balanced loads.

5. The autonomous charging management system for electric vehicles according to claim 1, further comprising for a node with unbalanced loads, means for lumping together all EVs on each phase charging on said node into a super EV, the initial SOC of the super EV being obtained by adding up the initial SOCs of the individual EVs at that phase.

6. The autonomous charging management system for electric vehicles according to claim 1, further comprising a power draw rate limiter applied to the EV power draw signal, $PD_i$, wherein any possible undesirable oscillations are suppressed in the controller response.

7. The autonomous charging management system for electric vehicles according to claim 6, wherein the power draw rate limiter is operable using a rate limit of between 5% and 50%.

\* \* \* \* \*